United States Patent [19]

Furukawa

[11] 4,337,470

[45] Jun. 29, 1982

[54] INK JET PRINTING APPARATUS WITH VARIABLE CHARACTER SIZE

[76] Inventor: Tatsuya Furukawa, c/o Ricoh Company, Ltd., 3-6, 1-chome Nakamagome, Ota-ku, Tokyo, Japan

[21] Appl. No.: 194,099

[22] Filed: Oct. 6, 1980

[30] Foreign Application Priority Data

Oct. 13, 1979 [JP] Japan ............................. 54-132186

[51] Int. Cl.³ ............................................. G01D 15/18

[52] U.S. Cl. ................................. 346/75; 346/140 R

[58] Field of Search ............... 346/75, 140 IJ, 140 PD

[56] References Cited

U.S. PATENT DOCUMENTS

| | | | |
|---|---|---|---|
| 4,016,571 | 4/1977 | Yamada | 346/75 |
| 4,068,241 | 1/1978 | Yamada | 346/75 |
| 4,087,825 | 5/1978 | Chen et al. | 346/75 |
| 4,215,350 | 7/1980 | Mielke et al. | 346/75 |
| 4,231,048 | 10/1980 | Horike et al. | 346/140 PD |

*Primary Examiner*—George H. Miller, Jr.

[57] ABSTRACT

A printed dot size is varied by varying a frequency of pressure oscillation applied by a vibratory (18) to ink in an ink ejection head (17), the vibration causing the ink to be ejected from the head (17) and separate into droplets. The variation in ink drop size enables variation of the printed image size by varying an amount of electrostatic deflection of the ink jet and a carriage speed by corresponding amounts.

4 Claims, 2 Drawing Figures

Fig. I

INK JET PRINTING APPARATUS WITH VARIABLE CHARACTER SIZE

BACKGROUND OF THE INVENTION

The present invention relates to an ink jet printing apparatus. In such an apparatus, ink is supplied into an ink jet head and subjected to pressure oscillation by a vibrator. This pressure oscillation causes the ink to be ejected from the head and separate into droplets. Where it is desired to print a drop on a sheet of paper, an electrostatic charge is applied to the droplets. The charged droplets are electrostatically deflected by deflection electrodes and hit the paper to print the dot. Where it is not desired to print a dot, the droplets are not charged and are therefore not deflected by the deflection electrodes and hit a gutter instead of the paper.

In many applications, it is desirable to be able to vary the size of the characters or other image being printed by the apparatus. This has been done in the prior art by providing a character generator which stores character patterns of the various sizes. However, this expedient is not entirely satisfactory due to the requirement of a large character generator for storing the multiple patterns and the control circuitry for changing between the various sizes.

SUMMARY OF THE INVENTION

An ink jet printing apparatus embodying the present invention includes an ink jet head, vibrator means for applying pressure oscillation to ink in the ink jet head thereby causing the ink to be ejected from the ink jet head and separated into droplets, charging means for charging the ink droplets, deflection means for deflecting the charged ink droplets and carriage means for producing relative movement between the ink jet head and a sheet against which the ink is ejected for printing, and is characterized by comprising control means for controlling a size of images printed by the apparatus, the control means varying a frequency of pressure oscillation of the vibrator means and thereby a printed dot size in accordance with a desired image size and controlling an amount of deflection of the ink droplets and a speed of movement of the carriage means in accordance with the desired image size.

In accordance with the present invention, a printed dot size is varied by varying a frequency of pressure oscillation applied by a vibrator to ink in an ink ejection head, the vibration causing the ink to be ejected from the head and separate into droplets. The variation in drop size enables variation in the printed image size by varying an amount of electrostatic deflection of the ink jet and a carriage speed by corresponding amounts.

It is an object of the present invention to provide an improved ink jet printing apparatus comprising means for varying a printed image size in a simplified manner using a reduced number of component parts compared to the prior art.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
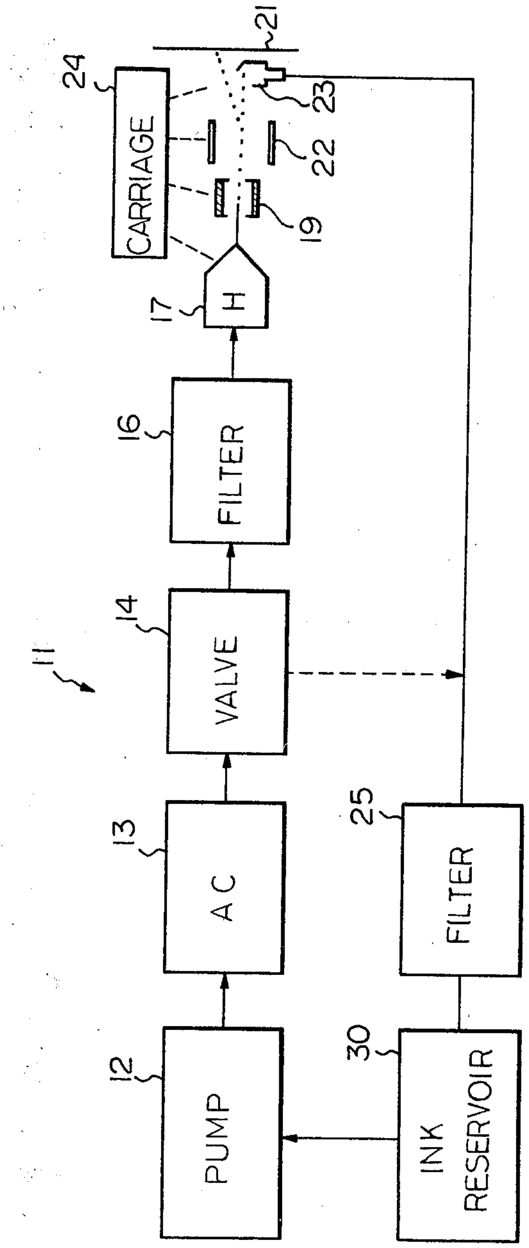
FIG. 1 is a block diagram illustrating the basic components of an ink jet printing apparatus to which the present invention applies.

Referring now to FIG. 1 of the drawing, an ink jet printing apparatus embodying the present invention is generally designated by the reference numeral 11 and comprises a pump 12 which supplies ink into an ink ejection head 17 through an accumulator 13, three way valve 14 and filter 16. Ink is ejected from the head 17 by means of an electrostatic vibrator 18 (see FIG. 2) which applies pressure oscillation to the ink at a predetermined frequency. The ink jet separates into droplets in the vicinity of charging electrodes 19 which apply an electrostatic charge to the ink jet where it is desired to print a dot on a sheet of paper 21. The charged droplets are deflected by deflection electrodes 22 and hit the paper 21. Where it is desired not to print a dot, the ink jet is not charged by the electrodes 19 and is therefore not deflected by the electrodes 22. In this case, the ink droplets are caught in a gutter 23 and do not hit the paper 21. The head 17, electrodes 19 and 22 and gutter 23 are moved relative to the paper 21 perpendicular to the plane of the drawing by a carriage 24 for printing a line. The paper 21 is moved incrementally in the vertical direction as viewed in the drawing for line spacing. The ink droplets caught in the gutter 23 are fed through a filter 25 to an ink reservoir 30.

Figure 2:
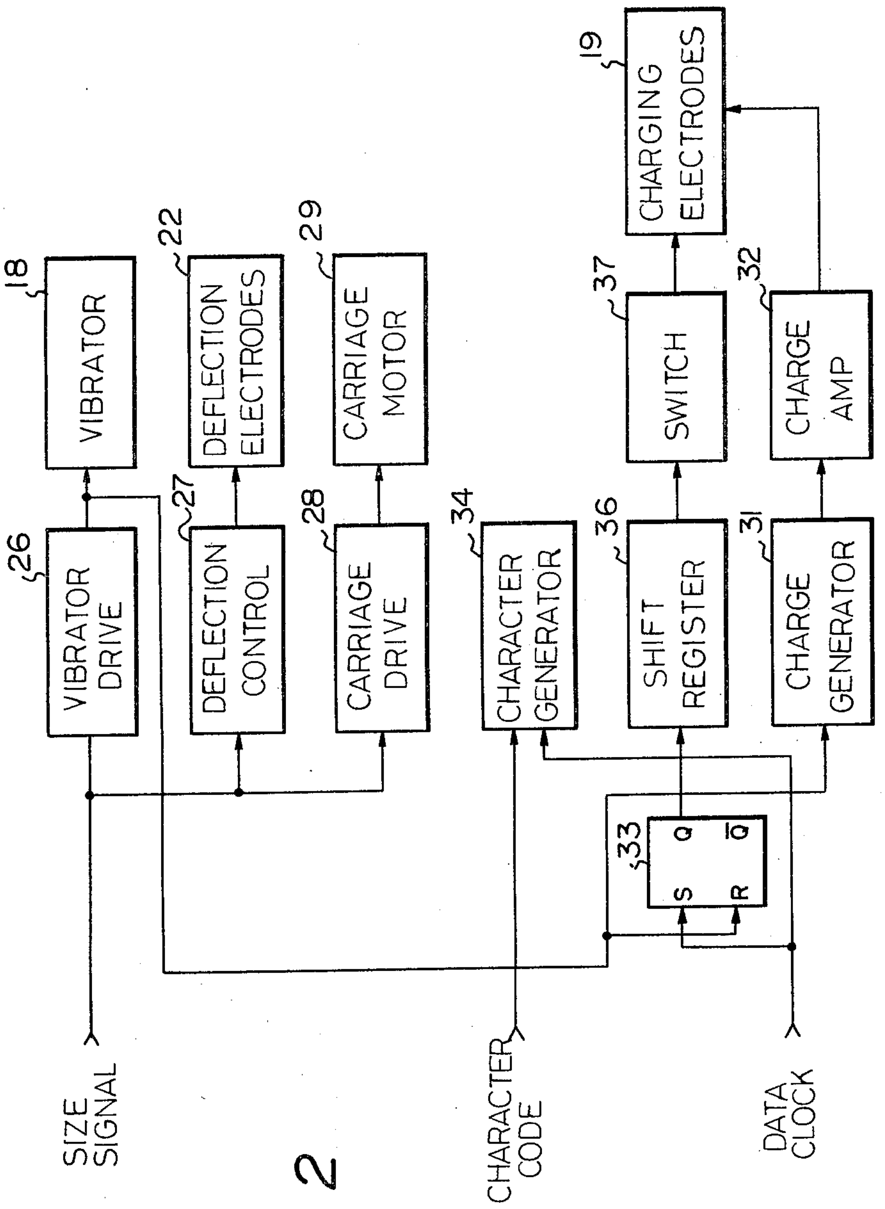
FIG. 2 is a block diagram illustrating size control means in accordance with the present invention.

Referring to FIG. 2, an essential part of the ink jet printing apparatus 11 according to the present invention is shown in block diagram form. The apparatus 11 includes a drive circuit 26 adapted to drive the ultrasonic vibrator 18 for the ink jet head 17, a deflection voltage control circuit 27, a carriage drive circuit 28 and a carriage drive motor 29.

In operation, a switch or the like (not shown) is manipulated to set the desired dimensions or size of characters to be printed. Then the pressure oscillation frequency of the drive circuit 26 and therefore the drive frequency of the vibrator 18 are varied. The vibrator 18 in turn varies the timing at which the jet of ink ejected from the ink jet heat 17 separates into droplets, thereby changing the diameter of the ink droplets. Supposing that ink droplets are of a diameter d mm and spaced $\lambda$ mm from each other, the ink jet can be stably separated into droplets when the ratio $\lambda/d$ ranges from 4 to 8. Since the dot size on the paper 21 formed by impinged ink droplets is proportional to the volume of the ink droplets, the dot size or diameter on the paper 21 can be freely varied by up to about a factor of two by varying the drive frequency of the vibrator 18 and thereby the droplet diameter. Accordingly, the character size on the paper 21 can be varied by altering the deflection voltage and carriage feed speed in accordance with the selected size of the ink droplets. Where the selected droplet diameter is relatively large, the deflection voltage will be made high and the carriage 24 will be fed at a high rate. For instance, a twice enlarged printing size is obtainable by halving the vibrator drive frequency and multiplying the carriage speed by $\sqrt{2}/2$.

The reference numeral 31 denotes a charge data generation circuit and 32 a charging signal amplifier circuit. These circuit components 31 and 32, instead of varying the deflection voltage according to a selected droplet diameter, may be controlled in accordance with the drive frequency to adjust the voltage which is applied to the charging electrodes 19. If desired, both the deflection voltage and charging voltage may be varied.

The circuitry of FIG. 2 further includes an RS flip-flop 33, a character generator 34, a shift register 36 and a switching circuit 37. The flip-flop 33 is controlled by a print start clock pulse from the drive circuit 26 and in turn operates the shift register 36 with its Q output. Then, as in a prior art ink jet printer, the switching circuit 37 selects a voltage to be applied to the charging electrodes 19.

In summary, an ink jet printer according to the present invention can print a desired size of characters on a paper sheet by varying the oscillation frequency of the ink jet head. This needs only one set of character codes in a character generator and therefore cuts down the overall cost of the printer.

Various modifications will become possible for those skilled in the art after receiving the teachings of the present disclosure without departing from the scope thereof.

What is claimed is:

1. An ink jet printing apparatus including an ink jet head, vibrator means for applying pressure oscillation to ink in the ink jet head thereby causing the ink to be ejected from the ink jet head and separated into droplets, charging means for charging the ink droplets, deflection means for deflecting the charged ink droplets and carriage means for producing relative movement between the ink jet head and a sheet against which the ink is ejected for printing, characterized by comprising:

control means for controlling a size of images printed by the printing apparatus, the control means varying a frequency of pressure oscillation of the vibrator means and thereby a printed dot size in accordance with a desired image size and controlling an amount of deflection of the ink droplets and a speed of movement of the carriage means in accordance with the desired image size.

2. An apparatus as in claim 1, in which the control means is constructed to decrease the frequency of pressure oscillation, increase the amount of deflection and increase the speed of the carriage means in order to increase the printed dot size.

3. An apparatus as in claim 1, in which the control means is constructed to increase the amount of deflection by increasing a voltage applied to the deflection means.

4. An apparatus as in claim 1, in which the control means is constructed to increase the deflection by increasing a voltage applied to the charging means.

* * * * *